US009578469B2

(12) United States Patent
Ruelke et al.

(10) Patent No.: US 9,578,469 B2
(45) Date of Patent: Feb. 21, 2017

(54) METHOD AND SYSTEM FOR DIRECT MODE COMMUNICATION WITHIN A TALKGROUP

(71) Applicant: MOTOROLA SOLUTIONS, INC, Schaumburg, IL (US)

(72) Inventors: Charles R. Ruelke, Coral Springs, FL (US); Robert J. Corke, Glen Ellyn, IL (US); Bob Logalbo, Rolling Meadows, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/505,202

(22) Filed: Oct. 2, 2014

(65) Prior Publication Data
US 2016/0100294 A1 Apr. 7, 2016

(51) Int. Cl.
H04B 7/00 (2006.01)
H04W 4/08 (2009.01)
H04L 5/00 (2006.01)
H04W 72/04 (2009.01)
H04W 76/00 (2009.01)
H04W 84/08 (2009.01)

(52) U.S. Cl.
CPC .............. *H04W 4/08* (2013.01); *H04L 5/0016* (2013.01); *H04W 72/048* (2013.01); *H04W 76/005* (2013.01); *H04W 84/08* (2013.01)

(58) Field of Classification Search
CPC ............................. H04W 72/02; H04W 72/04
See application file for complete search history.

(56) References Cited

U.S. PATENT DOCUMENTS

| | | | |
|---|---|---|---|
| 3,345,568 | A | 10/1967 | Errichiello et al. |
| 3,686,637 | A | 8/1972 | Zachar et al. |
| D226,093 | S | 1/1973 | Whitling et al. |
| D237,893 | S | 12/1975 | Wennerstrom et al. |
| D240,835 | S | 8/1976 | Toth et al. |

(Continued)

FOREIGN PATENT DOCUMENTS

| | | |
|---|---|---|
| EP | 1 695 574 B1 | 8/2006 |
| EP | 2515585 A1 | 10/2012 |

(Continued)

OTHER PUBLICATIONS

Charan Langton, CDMA Tutorial, www.complextoreal.com, 2002.*

(Continued)

*Primary Examiner* — Mohammed Rachedine

(57) ABSTRACT

A method and system for direct mode operation (DMO) of a talkgroup enables device to device (D2D) DMO operation leveraged from a Land Mobile Radio (LMR) system. The method includes scanning at a radio receiver a defined radio frequency spectrum; receiving at the radio receiver in the defined radio frequency spectrum a wake-up signal; identifying a talkgroup identifier in the wake-up signal, wherein the talkgroup identifier corresponds to a talkgroup being monitored by the radio receiver; in response to identifying the talkgroup identifier, decoding code sequences included in the wake-up signal; identifying in at least one of the code sequences both a center frequency and a transmission bandwidth of the DMO transmission; and tuning the radio receiver to receive the DMO transmission at the center frequency and transmission bandwidth.

16 Claims, 6 Drawing Sheets

(56) References Cited

U.S. PATENT DOCUMENTS

| | | | |
|---|---|---|---|
| D243,861 S | 3/1977 | Akazawa | |
| D271,764 S | 12/1983 | Toth et al. | |
| D273,864 S | 5/1984 | Eckmann | |
| D276,159 S | 10/1984 | Huntington | |
| D281,602 S | 12/1985 | Liautaud et al. | |
| 4,685,132 A | 8/1987 | Bishop et al. | |
| D292,209 S | 10/1987 | Fuhrman | |
| 4,850,019 A | 7/1989 | Shimizu et al. | |
| D302,686 S | 8/1989 | Claxton et al. | |
| D302,687 S | 8/1989 | Claxton et al. | |
| D302,688 S | 8/1989 | Toth et al. | |
| 4,858,798 A | 8/1989 | Siddoway et al. | |
| D322,251 S | 12/1991 | Siddoway | |
| 5,103,459 A | 4/1992 | Gilhousen et al. | |
| 5,210,771 A | 5/1993 | Schaeffer et al. | |
| 5,251,233 A | 10/1993 | Labedz et al. | |
| 5,294,931 A | 3/1994 | Meier | |
| D348,664 S | 7/1994 | Imazeki | |
| D350,347 S | 9/1994 | Tracy et al. | |
| D351,383 S | 10/1994 | Richards et al. | |
| 5,463,657 A | 10/1995 | Rice | |
| 5,488,631 A | 1/1996 | Gold et al. | |
| 5,500,651 A | 3/1996 | Schuermann | |
| 5,500,856 A | 3/1996 | Nagase et al. | |
| 5,539,775 A | 7/1996 | Tuttle et al. | |
| 5,640,442 A | 6/1997 | Fitzgerald et al. | |
| D382,869 S | 8/1997 | Siddoway et al. | |
| D382,870 S | 8/1997 | Siddoway | |
| D393,638 S | 4/1998 | Page et al. | |
| 5,771,228 A | 6/1998 | Seetharam et al. | |
| 5,771,288 A | 6/1998 | Dent et al. | |
| D399,504 S | 10/1998 | Lindeman et al. | |
| 5,844,509 A | 12/1998 | Behrens | |
| 5,850,187 A | 12/1998 | Carrender et al. | |
| 5,859,839 A | 1/1999 | Ahlenius et al. | |
| D406,833 S | 3/1999 | Page et al. | |
| 5,883,929 A | 3/1999 | Wang et al. | |
| D408,811 S | 4/1999 | Page et al. | |
| 5,898,740 A | 4/1999 | Laakso et al. | |
| D409,997 S | 5/1999 | Heuel | |
| 5,917,915 A | 6/1999 | Hirose | |
| 5,974,078 A | 10/1999 | Tuttle et al. | |
| 6,091,761 A | 7/2000 | Popovic | |
| 6,101,176 A | 8/2000 | Honkasalo et al. | |
| 6,256,487 B1 | 7/2001 | Bruhn | |
| 6,260,171 B1 | 7/2001 | Gray | |
| 6,275,478 B1 | 8/2001 | Tiedemann, Jr. | |
| 6,285,887 B1 | 9/2001 | Mimura | |
| 6,314,186 B1 | 11/2001 | Lee et al. | |
| 6,339,599 B1 | 1/2002 | Hwang et al. | |
| 6,385,264 B1 | 5/2002 | Terasawa et al. | |
| 6,463,047 B1 | 10/2002 | Cui et al. | |
| 6,510,143 B1 | 1/2003 | Bejjani et al. | |
| 6,519,472 B1 | 2/2003 | Brennan et al. | |
| 6,535,716 B1 | 3/2003 | Reichman et al. | |
| 6,545,994 B2 | 4/2003 | Nelson, Jr. et al. | |
| 6,549,119 B1 | 4/2003 | Turner | |
| 6,570,487 B1 | 5/2003 | Steeves | |
| 6,671,338 B1 | 12/2003 | Gamal et al. | |
| 6,690,714 B1 | 2/2004 | Iwamatsu et al. | |
| 6,754,190 B2 | 6/2004 | Gurney et al. | |
| 6,782,264 B2 | 8/2004 | Anderson | |
| 6,868,076 B2 | 3/2005 | Schilling et al. | |
| 6,982,945 B1 | 1/2006 | Gossett | |
| 7,099,469 B2 | 8/2006 | Kuhlman et al. | |
| 7,133,432 B2 | 11/2006 | Kuffner et al. | |
| 7,161,971 B2 | 1/2007 | Tiedemann et al. | |
| 7,227,885 B2 | 6/2007 | Gurney et al. | |
| 7,388,932 B1 | 6/2008 | Zhang et al. | |
| 7,706,765 B2 | 4/2010 | Collins et al. | |
| 8,027,696 B2 | 9/2011 | Wiatrowski et al. | |
| 8,374,249 B2 | 2/2013 | Suh et al. | |
| 8,401,030 B2 | 3/2013 | Chaudhri et al. | |
| 8,634,386 B2 | 1/2014 | Jagger et al. | |
| 2001/0053143 A1 | 12/2001 | Li et al. | |
| 2002/0058528 A1 | 5/2002 | Hunzinger | |
| 2003/0071752 A1 | 4/2003 | Miyoshi et al. | |
| 2003/0202561 A1 | 10/2003 | Tiedemann et al. | |
| 2006/0018292 A1* | 1/2006 | Wiatrowski | H04W 48/12 370/337 |
| 2007/0242600 A1* | 10/2007 | Li | H04L 5/0007 370/210 |
| 2008/0225890 A1 | 9/2008 | Howard | |
| 2010/0099397 A1 | 4/2010 | Belmonte et al. | |
| 2011/0228666 A1 | 9/2011 | Barbieri et al. | |
| 2012/0224612 A1 | 9/2012 | Kim et al. | |
| 2014/0064203 A1 | 3/2014 | Seo et al. | |
| 2014/0071931 A1 | 3/2014 | Lee et al. | |
| 2015/0139006 A1* | 5/2015 | Seo | H04J 11/005 370/252 |

FOREIGN PATENT DOCUMENTS

| | | | |
|---|---|---|---|
| EP | 2 592 804 A1 | 5/2013 | |
| JP | S62-213442 A | 9/1987 | |
| JP | 3039334 B2 | 5/2000 | |
| JP | 2001-282936 A | 10/2001 | |
| KR | WO 2014003457 A1 * | 1/2014 | H04J 11/005 |
| WO | 91/00655 A1 | 1/1991 | |
| WO | 95/03652 A1 | 2/1995 | |
| WO | 95/17059 A1 | 6/1995 | |
| WO | 97/37469 A1 | 10/1997 | |
| WO | 0041543 A2 | 7/2000 | |
| WO | 01/59968 A1 | 8/2001 | |
| WO | 2010017629 A1 | 2/2010 | |
| WO | 2013043617 A1 | 3/2013 | |
| WO | 2013109100 A1 | 7/2013 | |
| WO | 2013113371 A1 | 8/2013 | |
| WO | 2014018333 A3 | 1/2014 | |
| WO | 2014022769 A1 | 2/2014 | |
| WO | 2014051791 A1 | 4/2014 | |
| WO | 2014088846 A1 | 6/2014 | |

OTHER PUBLICATIONS

International Search Report and Written Opinion for corresponding International Patent Application No. PCT/US2015/051126, mailed on Dec. 8, 2015.

Brock, D.L. "White Paper: The Electronic Product CodeTM," MIT-Auto ID Center, Jun. 1, 2003, pp. 1-23.

Cohn, M. and Lempel A. "On Fast M-Sequence Transforms" Manuscript received Aug. 5, 1975, revised Jan. 26, 1976, pp. 135-137.

Nguyen, L. "Self-Encoded Spread Spectrum Communications" MILCOM 1999 IEEE Military Communications Conference Proceedings 1999 United State IEEE Oct. 31, 1999 vol. 1 pp. 182-186.

Stalling, W., "Cryptography and Network Security—Principles and Practice," 1999, Prentice Hall, 2nd Edition, pp. 109-114.

Non-Final Office Action mailed Feb. 8, 2005, in U.S. Appl. No. 09/982,271, Gurney D.P. et al., filed Oct. 17, 2001.

Non-Final Office Action mailed Jun. 14, 2005, in U.S. Appl. No. 09/982,271, Gurney D.P. et al., filed Oct. 17, 2001.

Final Office Action mailed Nov. 28, 2005, in U.S. Appl. No. 09/982,271, Gurney D.P. et al., filed Oct. 17, 2001.

Advisory Action mailed Feb. 15, 2006, in U.S. Appl. No. 09/982,271, Gurney D.P. et al., filed Oct. 17, 2001.

Non-Final Office Action mailed Apr. 26, 2006, in U.S. Appl. No. 09/982,271, Gurney D.P. et al., filed Oct. 17, 2001.

Notice of Allowance mailed Mar. 21, 2007, in U.S. Appl. No. 09/982,271, Gurney D.P. et al., filed Oct. 17, 2001.

International Preliminary Report on Patentability for corresponding International Patent Application No. PCT/US2002/031858, mailed on May 21, 2008.

International Search Report for corresponding International Patent Application No. PCT/US2002/031858, mailed on Nov. 17, 2003.

English-language translation of Official Notification mailed Mar. 6, 2004, for corresponding Taiwanese Patent Application No. 091123928, filed Oct. 17, 2002.

(56) References Cited

OTHER PUBLICATIONS

English-language translation of Notification Prior to Examination mailed Jun. 24, 2007, for corresponding Israeli Patent Application No. 161169, filed Mar. 30, 2004.
English-language translation of Notification of Defects mailed Sep. 1, 2008, for corresponding Israeli Patent Application No. 161169, filed Mar. 30, 2004.
Supplementary Partial European Search Report mailed Jul. 28, 2006, for corresponding European Patent Application No. 02801657.4, filed Oct. 4, 2002.
Supplementary European Search Report mailed Oct. 13, 2006, for corresponding European Patent Application No. 02801657.4, filed Oct. 4, 2002.
Office Action mailed Jan. 19, 2009, for corresponding European Patent Application No. 02801657.4, filed Oct. 4, 2002.
English-language translation of Decision of Refusal mailed Dec. 11, 2007, for corresponding Japanese Patent Application No. 2003-537231, filed Apr. 19, 2004.
English-language translation of Notice of Allowance mailed Apr. 10, 2008, for corresponding Japanese Patent Application No. 2003-537231, filed Apr. 19, 2004.
English-language translation of First Office Action mailed May 8, 2009, for corresponding Chinese Patent Application No. 02820625.8, filed Apr. 16, 2004.
English-language translation of Decision on Rejection mailed Nov. 2, 2010, for corresponding Chinese Patent Application No. 02820625.8, filed Apr. 16, 2004.
English-language translation of Notice of Allowance mailed Oct. 19, 2010, for corresponding Japanese Patent Application No. 2007-061794, filed Mar. 12, 2007.
English-language translation of Notice of Allowance mailed Jul. 22, 2008, for corresponding Japanese Patent Application No. 2007-143755, filed May 30, 2007.
Non-Final Office Action mailed Sep. 12, 2003, in U.S. Appl. No. 09/981,031, Gurney D.P. et al., filed Oct. 17, 2001.
Notice of Allowance mailed Apr. 5, 2004, in U.S. Appl. No. 09/981,031, Gurney D.P. et al., filed Oct. 17, 2001.
Non-Final Office Action mailed Jul. 6, 2005, in U.S. Appl. No. 09/978,890, Kuhlman, D.A. et al., filed Oct. 17, 2001.
Notice of Allowance mailed Dec. 21, 2005, in U.S. Appl. No. 09/978,890, Kuhlman, D.A. et al., filed Oct. 17, 2001.
Non-Final Office Action mailed Jun. 14, 2005, in U.S. Appl. No. 09/982,279, Kuffner, S.L. et al., filed Oct. 17, 2001.
Final Office Action mailed Nov. 28, 2005, in U.S. Appl. No. 09/982,279, Kuffner, S.L. et al., filed Oct. 17, 2001.
Advisory Action mailed Feb. 15, 2006, in U.S. Appl. No. 09/982,279, Kuffner, S.L. et al., filed Oct. 17, 2001.
Non-Final Office Action mailed Apr. 25, 2006, in U.S. Appl. No. 09/982,279, Kuffner, S.L. et al., filed Oct. 17, 2001.
Notice of Allowance mailed Aug. 10, 2006, in U.S. Appl. No. 09/982,279, Kuffner, S.L. et al., filed Oct. 17, 2001.
Non-Final Office Action mailed Sep. 2, 2004, in U.S. Appl. No. 09/981,476, Collins, T.J. et al., filed Oct. 17, 2001.
Final Office Action mailed May 24, 2005, in U.S. Appl. No. 09/981,476, Collins, T.J. et al., filed Oct. 17, 2001.
Advisory Action mailed Aug. 25, 2005, in U.S. Appl. No. 09/981,476, Collins, T.J. et al., filed Oct. 17, 2001.
Non-Final Office Action mailed Dec. 20, 2005, in U.S. Appl. No. 09/981,476, Collins, T.J. et al., filed Oct. 17, 2001.
Final Office Action mailed Jun. 15, 2006, in U.S. Appl. No. 09/981,476, Collins, T.J. et al., filed Oct. 17, 2001.
Advisory Action mailed Aug. 28, 2006, in U.S. Appl. No. 09/981,476, Collins, T.J. et al., filed Oct. 17, 2001.
Notice of Allowance mailed Jul. 13, 2009, in U.S. Appl. No. 09/981,476, Collins, T.J. et al., filed Oct. 17, 2001.
Notice of Allowance mailed Dec. 24, 2009, in U.S. Appl. No. 09/981,476, Collins, T.J. et al., filed Oct. 17, 2001.

* cited by examiner

METHOD AND SYSTEM FOR DIRECT MODE COMMUNICATION WITHIN A TALKGROUP

BACKGROUND OF THE INVENTION

Wireless communication systems often comprise a group of subscribers and a set of stationary "base radios" or "base stations" (also known as "repeaters"). The subscribers are typically endpoints of a communication path over a channel resource, (e.g., a voice channel) of the wireless communication system, wherein the repeaters are typically the intermediaries by which the communication path to a subscriber may be established or maintained. There are often many simultaneous communications taking place in the wireless communication system. Groups of users that may use a shared communication system can be affiliated within specific talk groups which may exclude other users of the communication system. In this way, users within a common talk group can communicate between themselves without their communications being available to everyone who happens to have access to a shared communication system. Therefore, a talkgroup call allows a user of one subscriber to speak while several other affiliated subscribers listen. The group of subscribers participating in the call are corporately called the talkgroup. Because there are often many simultaneous communications taking place in the wireless communication system, a user may wish to participate in one talkgroup call while monitoring other communications such as may occur in other talkgroup calls.

Direct mode operation (DMO) is a communication technique where a radio can communicate with one or more other radios without the need for additional infrastructure equipment (e.g. base stations or repeaters). Thus direct mode operation can provide a more efficient, less costly communication system than repeater mode operation, although the DMO means of commutation may afford less coverage range due to the reduced power of the hand held portable as compared to the base station. Further, the use of direct mode operation that supports talkgroup affiliation, while providing efficient communication of the DMO operational parameters is therefore desirable so as to provide for optimal data throughout and power efficiency Accordingly, there is a need for an improved method and system for direct mode communication within a talkgroup.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
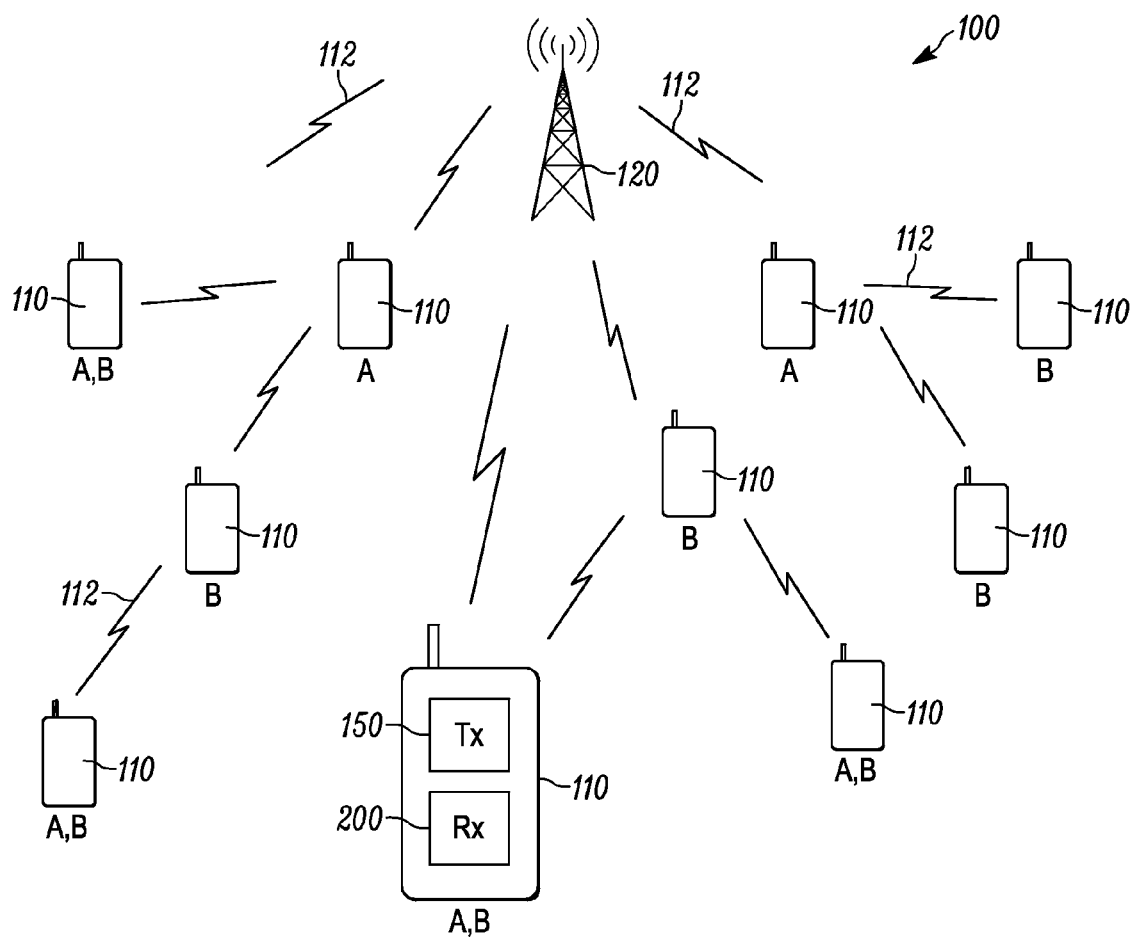
FIG. 1 is a general block diagram of a radio network, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to some embodiments, the present disclosure describes a method for receiving at a radio receiver a direct mode operation (DMO) transmission within a talkgroup. The method includes a radio receiver scanning valid RF channels within a defined radio frequency spectrum. A wake-up signal that includes a talkgroup identifier is then received by the radio receiver over a valid channel in the defined radio frequency spectrum. The talkgroup identifier corresponds to a talkgroup which includes the appropriate identifier affiliated with the scanning radio receiver. In response to identifying the talkgroup identifier, code sequences included in the wake-up signal are decoded. In at least one of the code sequences both a center frequency and a transmission bandwidth of the DMO transmission are identified. The radio receiver is then reconfigured as necessary to receive the DMO transmission at the assigned center frequency and transmission bandwidth.

Advantages of the present disclosure include enabling device to device (D2D) communication similar to that of Land Mobile Radio (LMR) systems, within an alternate protocol's standard framing structure (such as the Long-Term Evolution (LTE) framing structure) while preserving the agile RF frequency configuration capability of the alternate protocol. A radio receiver is thus enabled to scale its bandwidth and center frequency to receive an appropriate DMO signal within the timing constraints of a secondary protocol. Also, a radio receiver can be affiliated with a targeted talkgroup incorporating many receivers without infrastructure assistance, and while not continuously possessing the entire DMO preamble, which can result in substantial battery power savings.

FIG. 1 is a general block diagram of a radio network 100, according to some embodiments. The radio network 100 includes a plurality of subscriber units 110 and at least one base station 120. The subscriber units 110 can be, for example, hand-held radio devices, devices built into personal equipment such as firefighting, police or military gear, vehicle-based devices or devices fixed in infrastructure such as buildings. The subscriber units 110 may wirelessly transmit and receive data using various wireless protocols such as WiMAX™, 802.11 a/b/g/n, Bluetooth™, 2G, 2.5G, 3G, and 4G, LTE, CDMA, TDMA, GSM, and other wireless protocols.

As shown by the radiated transmission indicator lines 112, some of the subscriber units 110 are within direct radio range of the base station 120, while other subscriber units 110 are not within direct range of the base station 120 but are only within range of one or more other subscriber units 110. The subscriber units 110 within direct radio range of the base station 120 are thus able to communicate with other subscriber units 110 by using the base station 120 as a relay in a trunked mode operation (TMO). This operation can be supported by various standards, such as Terrestrial Trunk Radio (TETRA), for radio communications on private/professional mobile radios.

TETRA supports both a trunked mode operation and a direct mode operation (DMO). In the trunked mode, the subscriber units 110 use network infrastructure, such as the base station 120, to communicate with each other. In direct mode, on the other hand, the subscriber units 110 communicate directly with other subscriber units 110 within a limited coverage area, without using the network infrastructure. Thus DMO is often used in situations where access to a TETRA network infrastructure is limited or unavailable.

The letters "A" and "B" shown below the subscriber units 110 indicate with which talkgroup or talkgroups a subscriber unit 110 is currently affiliated. Thus as shown some of the subscriber units 110 are participating only in talkgroup A, other subscriber units 110 are participating only in talkgroup B, and still other subscriber units 110 are participating in both talkgroups A and B. Further, some of the subscriber units 110 in each talkgroup A and B are in direct radio range of the base station 120 and thus can employ trunked mode operation, whereas other subscriber units 110 in each talkgroup A and B are not within direct radio range of the base station 120 and thus require direct mode operation to participate in the talkgroups A and B. Thus the radio network 100 enables direct mode communication within a talkgroup in accordance with the various embodiments described herein.

As understood by those having ordinary skill in the art, each subscriber unit 110 includes a transmitter system 150 for transmitting radio frequency signals in the radio network 100, and also a receiver system 200 for receiving radio frequency signals in the radio network 100. Further, as known by those having ordinary skill in the art, the transmitter system 150 and the receiver system 200 can be combined into a single transceiver system.

Figure 2A:
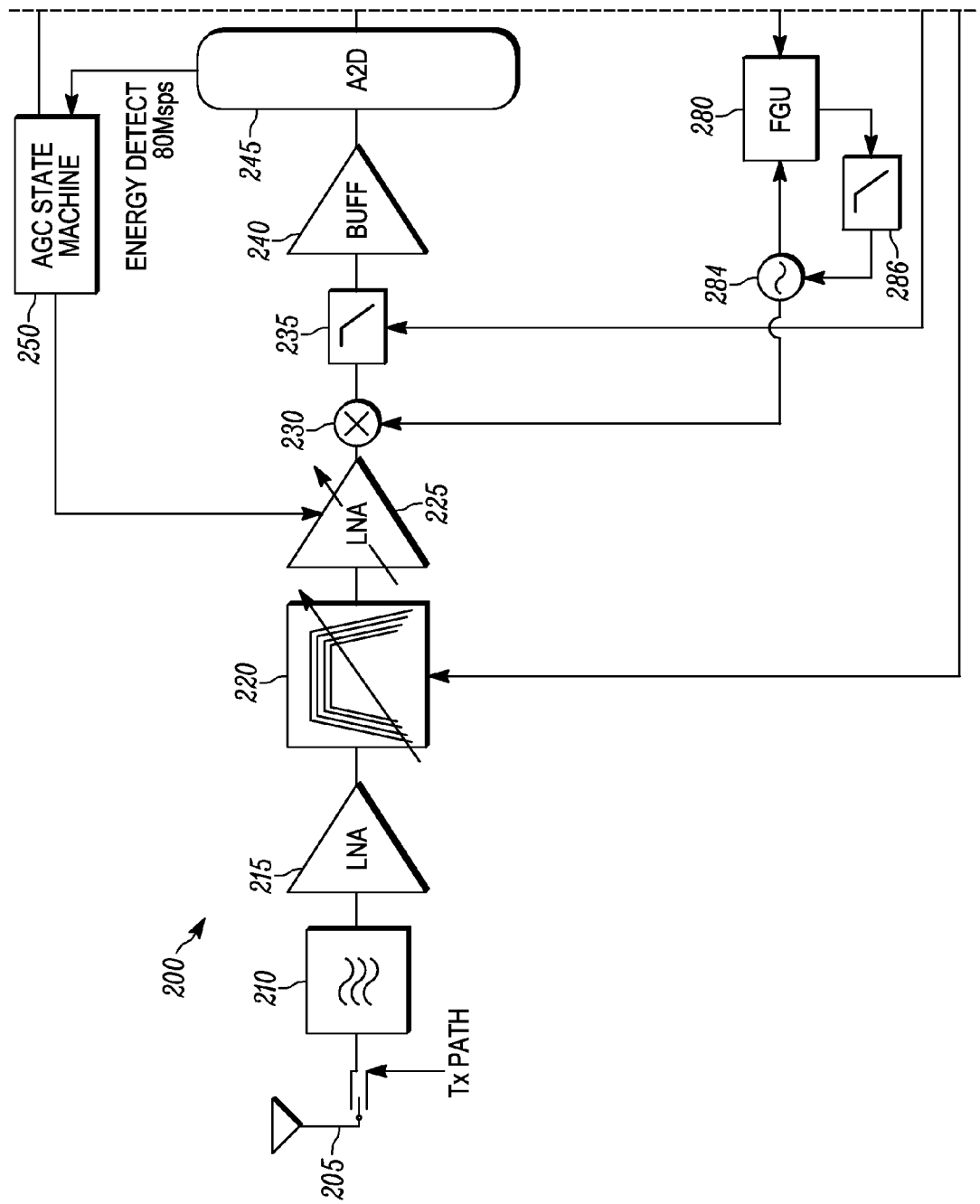
FIGS. 2A and 2B are block diagrams of elements of a receiver system built into one of the subscriber units operating in the radio network of FIG. 1, according to some embodiments.
Figure 2B:
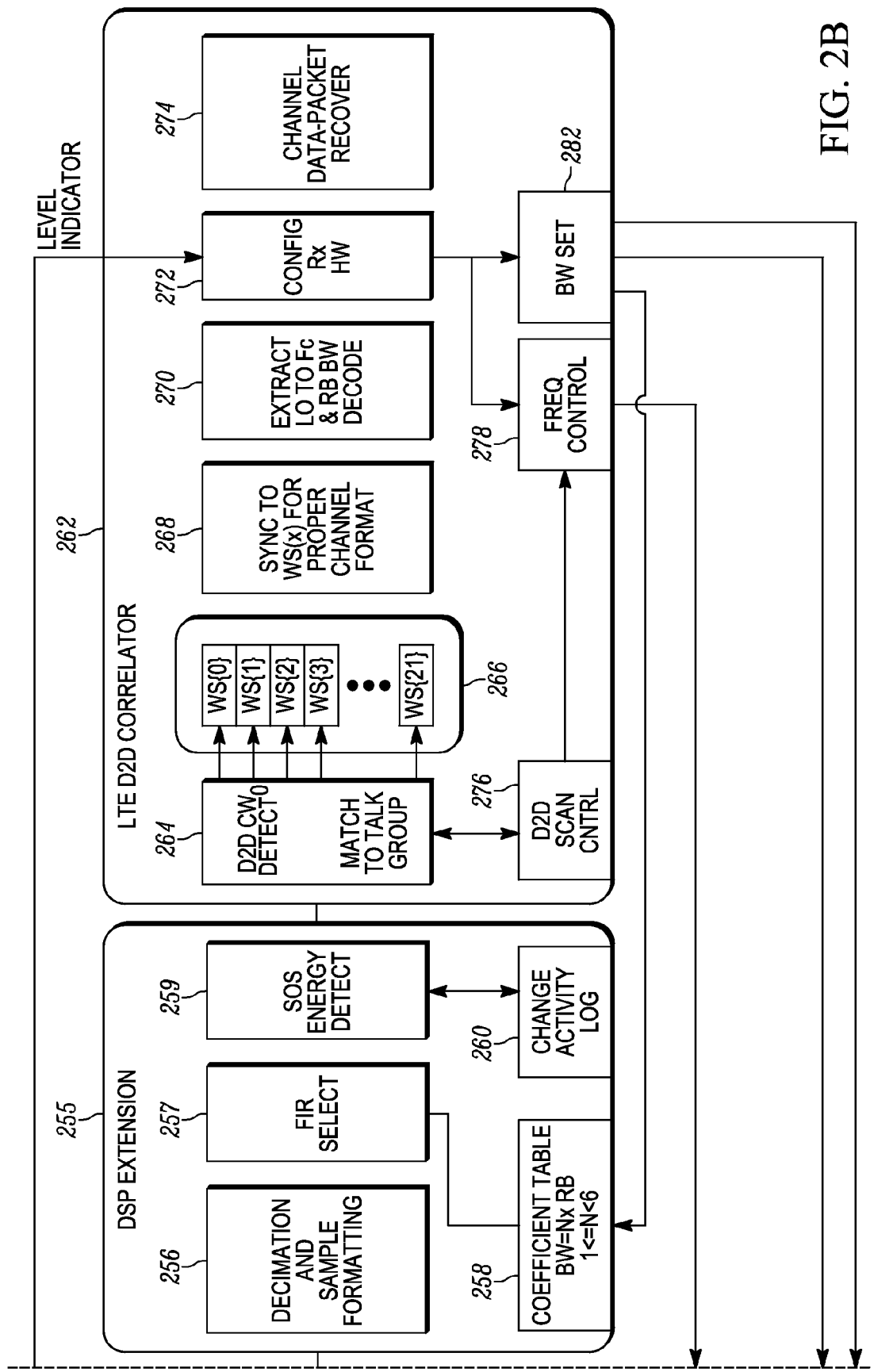

FIGS. 2A and 2B show block diagrams of elements of the receiver system 200 built into one of the subscriber units 110 operating in the radio network 100, according to some embodiments. The system 200 includes an antenna 205 that is operatively connected to a band specific radio frequency (RF) pre-selector filter 210 for providing attenuation of undesired out-of-band RF signals. An output of the filter 210 is connected to an input of a Low Now Amplifier (LNA) 215 for providing gain. The basic operation of the filter 210 and the LNA 215 are well known to those having ordinary skill in the art.

An output of the LNA 215 is connected to a band specific post-selector filter 220. The filter 220 includes variable bandwidth tunability and adjustable center frequency for providing attenuation of undesired out-of-band RF signals. This can be accomplished, for example, by using a parallel, discrete bank of filters or by using a hybrid design including Voltage Variable Capacitance (VVC) or varactor diodes. The center frequency and bandwidth (BW) settings for the filter 220 may be set by a control signal that is input into the filter 220.

An output of the filter 220 is connected to a second LNA 225 for providing gain and having some automatic gain control (AGC) capability. An output of the second LNA 225 is connected to a mixer 230 for translating an "on channel" received signal to an intermediate frequency (IF). An output of the mixer 230 is connected to a post mixer filter 235 for IF selectivity. An output of the post mixer filter 235 is connected to an amplifier 240 to provide additional post mixer IF gain of the on channel desired signal. As will be understood by those having ordinary skill in the art, the specific type and combination of post mixer filter 235 and the amplifier 240 stages depends on a specific topology of the receiver system 200. Further, those skilled in the art will appreciate that the functions of the post mixer filter 235 and the amplifier 240 also can be realized with distributed gain/filter stages.

An output of the amplifier 240 is connected to an analog-to-digital converter (ADC) 245. The output of the ADC is a sampled received signal, sampled at a rate that meets the Nyquist criterion for receiver bandwidth, which may be processed by an AGC controller 250 to determine the appropriate gain changes, as may be required systematically. A control voltage is produced at the output of the AGC controller 250, which is then fed back to the second LNA 225 having AGC capabilities. Those skilled in the art will appreciate that in some embodiments the AGC controller 250 can be incorporated into a digital processor.

An output of the ADC 245 is connected to a post ADC preprocessing block 255. A digital post-processing block 255 includes a digital decimation filter and sample formatting block 256, which is a compilation of digital blocks that convert raw ADC samples (e.g. sigma-delta modulation SDM bit sequences) into formatted samples at an appropriate sample rate and precision sufficient for subsequent signal processing, as is known in the art. The block 255 may also include a Finite Impulse Response (FIR) filter 257 that provides digital selectivity for attenuating undesired off-channel interference signals. The FIR filter 257 represents a compilation of digital filtering of both the composite spectrum containing a plurality of contiguous channels as may be sampled by the ADC, as well as the individual singulated channels as may be determined by a coefficient table block 258, as known in the art. By way of example, for an LTE secondary protocol, a RF channel may be understood to mean a particular Resource Block (RB) comprised of a plurality of resource elements. A plurality of RBs may be simultaneously sampled by the ADC block 245 and parallel processed in the post ADC digital processing block 255 as may be necessary to provide for reception of any arbitrary on channel desired RF signal.

The table block 258 includes tabularized coefficients corresponding to particular bandwidth settings sufficient to filter on-channel desired signals while attenuating undesired off-channel interference signals. The FIR filter 257 may be configured to process both contiguous spectrum containing multiple receive channels and/or singulated RF channels as may be appropriate for the secondary protocol (e.g. individual Resource Blocks defined within an LTE system). In a preferred embodiment, the FIR selectivity channels are generally LTE centric but are also extensible to other protocols. A Sum-of-Square (SOS) energy detector 259 is used for fast detection of the sampled received signal to determine if there is any received RF energy anywhere within a contiguous sampled RF spectrum. A channel activity log 260 registers detected energy/activity from the SOS energy detector 259 within each of the RB channels.

A protocol specific device-to-device (D2D) control system 262 enables direct mode communication affiliation compliant with that protocol. A correlation word block 264 demodulates and decodes the sampled received signals so as to determine the presence of an appropriate correlation word code that may be indicative of a radio talkgroup. If a proper correlation word is received, the receiver system 200 is affiliated with that targeted talkgroup, enabling subsequent post processing of the sampled received data. The enablement of the subsequent processing includes parallel processing of Walsh sequencing within a Walsh Sequence (WS) decoding block 266. The WS decoding block 266 enables parallel decoding of N-discrete sequences, where each sequence is orthogonal to any other sequence vector, and each sequence has an intrinsic function associated with the operational protocol. Such WS groupings may also carry secondary information wherein each WS index is correlated to a channel bandwidth and a center frequency of operations. In addition, the WS index may indicate the receiver BW for subsequent DMO operation, wherein the receiver BW may be comprised of combinations of individual or contiguous RB spectrum assignments.

A sync block 268 may detect an appropriate WS having a particular index from the N parallel processed RBs. Typically, to detect an appropriate WS a companion matched filter (correlated to that WS) will produced the strongest response, which is indicative of a valid WS code whose index indicates secondary information related to DMO operational telemetry. Because it is possible that there may not be a valid WS decode, proper thresholding for a valid detection is employed.

When a valid WS is detected and its associated index is recovered, bandwidth and frequency information is then extracted at block 270 from the particular WS index. Next, at block 272, the hardware of the receiver system 200 is configured as appropriate to operate in compliance with the frequency and bandwidth metrics previously recovered. At block 274, subsequent processing and decoding of received data packets contained within the sampled received signal data may commence after the proper receiver hardware configuration is accomplished. Thus normal reception and processing of data packet frames is supported using designated protocol timing.

A scan control block 276 determines the local oscillator (LO) frequency of operation and bandwidth settings based on channel activity detection from block 260 and/or proper talkgroup affiliation detection as generated from the scan control block 276. For example, a scan sequence can be interrupted should a valid Correlation Word (CW) be detected that the given receiver is affiliated with. This control methodology can be part of a sub-routine embedded in a processor of the receiver system 200.

A frequency control block 278 sets a control word for updating a frequency generation unit (FGU) 280 so that the LO source is updated (i.e., swept) synchronously with the procession of the D2D control system 262. The frequency control block 278 responds to control signals from the D2D scan control block 276 and/or hardware configuration block 272 so as to ensure that the appropriate center frequency is set for either DMO operation (fixed frequency) or scan operation (where the frequency is stepped through a series of iterations so as to sweep through the RF spectrum appropriate for the receiver system 200). An output control signal from the frequency control block 278 sets the FGU 280 to the appropriate configuration for generating the targeted frequency of operation. This also can be implemented as part of a sub-routine embedded in a processor of the receiver system 200.

A bandwidth control block 282 sets the control word for updating the appropriate channel selectivity so that undesired off-channel interference signals can be minimized synchronously with the procession of the D2D control system 262. A plurality of control signals from block 282 may be generated such as appropriate for each of the filtering blocks that may be distributed throughout the receiver system 200 (e.g., post-selector filter 220, IF filter 235, and FIR filter controller 258) so that each filter stage can be correctly configured for optimum receiver operation. This also can be implemented as part of a sub-routine embedded in a processor of the receiver system 200.

A voltage controlled oscillator (VCO) 284 functions as a Local Oscillator (LO) source for the mixer 230. A low pass filter 286 filters control voltage from the FGU 280 so as to mitigate LO sideband noise. The FGU 280 functions as a digital control system having a pre-scaler divider system for phase locking the VCO output frequency to a reference frequency source (not shown). This configuration creates a self-compensating phase locked loop system comprising the VCO 284, FGU 280 and low pass filter 286 as is well known in the art.

Those having ordinary skill in the art will appreciate that the hardware included in the receiver system 200 as described above can be modified appropriately so as to support a corresponding transmitter system 150 for transmitting a RF signal modulated with an appropriate talkgroup identifier for use in a direct mode operation (DMO) communication system. The transmitter system 150 and the receiver system 200 thus enable direct mode operation of a talk group operating in the radio network 100 as described herein.

Figure 3:
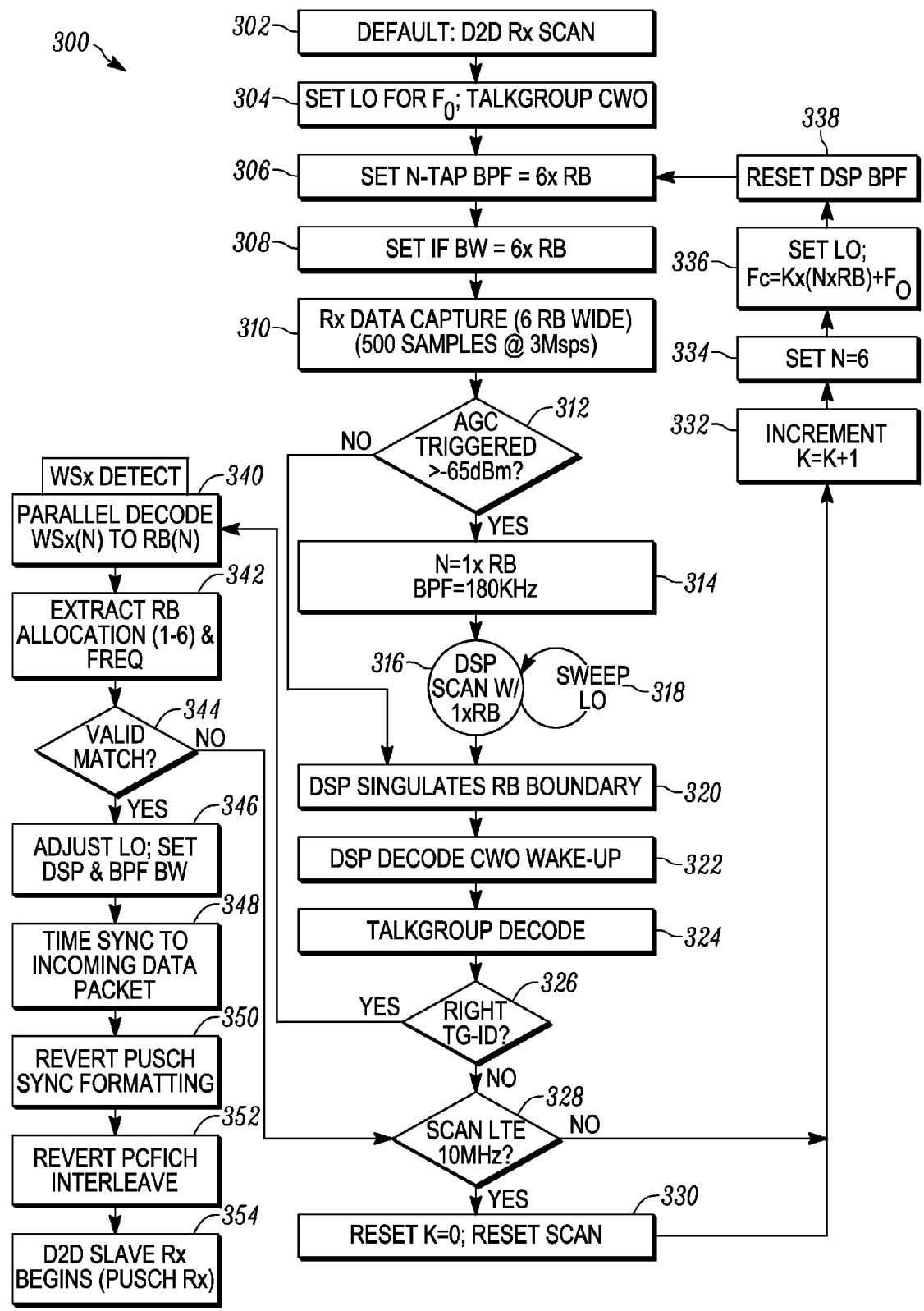
FIG. 3 is a block diagram illustrating a method for receiving at the radio receiver system of FIGS. 2A and 2B a direct mode operation (DMO) transmission to a talkgroup, according to some embodiments.

FIG. 3 is a block diagram illustrating a method 300 for receiving at the radio receiver system 200 a direct mode operation (DMO) transmission within a talkgroup, according to some embodiments. For example, such a DMO transmission may be between two subscriber units 110 participating in the talkgroup A or B shown in FIG. 1.

At block 302 the radio receiver system 200 is configured for an initial default operating state. Thus the system 200 is operational from a known "Power-on-Reset" (POR) state and all operational parameters bounding the RF spectrum and channel parameters are known. At block 304, an initial LO is defined as appropriate for receiving a RF bandwidth sufficiently wide so as to capture multiple contiguous RF channels (i.e., multiple channel/RB) for the purpose of scanning all possible RF channels within an operational spectra. Block 304 also sets a proper Correlation Word (CW0) affiliated with a talkgroup that is assigned to the particular subscriber unit 110 in which the radio receiver system 200 operates.

At block 306, a RF pre/post-selector Band Pass Filter (BPF) bandwidth of the receiver system 200 is set for wide-band scan operations, where the pass-band bandwidth is set to encompass a plurality of contiguous channels/RBs (e.g., 6× RB). At block 308, an intermediate frequency (IF) bandwidth of the receiver system 200 is set for wide-band scan operations, where the bandwidth is set to an integer number of contiguous channels/RBs (e.g., 6× RB). The IF bandwidth may be equal to, or different from the BPF bandwidth set in block 206; however, both the IF from block 308 and the BPF bandwidth from block 306 are correlated to each other in a known relationship.

At block 310, an appropriate number of samples are captured by the ADC 245 of the receiver system 200, where the number of samples is commensurate with a duration necessary to satisfy Nyquist criterion for the bandwidth setting. At block 312, the AGC controller 250 monitors the samples (in real-time as the samples are captured at block 310) for detection of received signals having power levels above a predefined threshold. The AGC threshold level may be unique to the particular topology of the receiver system 200, and will be set based on a combination of characteristics including, but not limited to, the dynamic range of the ADC 245, the combined gain of blocks 215, 225, 240, and an insertion loss of other receiver sub-systems including filters 210, 220, 235, and the mixer 230 of the system 200. Any signal above a set threshold (e.g., >−65 dBm) triggers the processing to branch to block 314. For signals less than or equal to the set threshold, the processing moves to block 320.

At block 320, when accessed from block 312, a post ADC selectivity filter singulates the sampled spectrum into individual RB channels, assuming the RF BPFs are configured for a wide-band scan operation. When accessed from block 316, control block 320 configures the FIR selectivity block 257 to independently filter each receive channel in tandem as may have been captured during the wide-band scan. After filtering, each of the individual RB channels is referred to as being singulated, where each RB channel can be processed individually to detect the presence of the correlation word CW0 at block 322. The duration of the CW0 transmission is long enough to allow a receiver within a targeted talkgroup to scan the entire range of the RF spectrum and still capture sufficient CW0 signaling after late detection, so as to properly decode the talkgroup affiliation. At block 324, the recovered CW0 from block 322 (if any) is correlated to a talkgroup identification (TG-ID) number to determine if a DMO sequence is being initiated within any of the plurality of RB channels.

At block 314, analog band pass filters (BPFs) previously set to wide bandwidth at blocks 306 and 308 are reset to a single RB channel bandwidth setting so as to provide for greater attenuation of close-in strong signal interferers. In addition, the FIR filter 257 is configured to process a single RB channel instead of tandem parallel processing of multiple received channels. After the receiver system 200 is appropriately configured for narrow band operation, additional samples are captured (similar to block 310). At block 316, the new narrow band samples are processed by the digital post-processing block 255 and the D2D detector block 264 so as to determine the presence of any desired RF signal within each RB channel. Accordingly, for each RB channel, the functions of blocks 320, 322, and 324 are accomplished sequentially within block 316 such that a talkgroup identification (TG-ID) vector (if any) for each channel is captured.

After a given RB channel has been sampled, and the TG-ID has been decoded for that RB channel (if any is present), the control bock 316 iterates to the next channel adjacent to the previous RB channel so as to capture additional narrow band samples for the new RB channel. This iterative process is repeated for each individual RB channel as may have been originally contained in the wide-band scan prior to decision block 312. Therefore, at block 318, the LO is iterated to an appropriate frequency corresponding to the next adjacent RB channel, and the functions of blocks 320, 322, and 324 are subsequently repeated for the narrow band receive configuration at block 316. The cycle between blocks 316 and 318 is repeated until all contiguous RB channels comprising the original wideband sampled spectrum are searched. Thus block 318 executes a receiver LO control that updates the receive frequency after each individual RB channel is processed at block 316 as part of the narrow band scan sequence. A single channel narrow band scan is triggered when a strong signal condition is detected at the decision block 312 during a wideband (i.e., simultaneous, multiple RB) scan.

At decision block 326, the TG-IDs are checked for each of the multiple RB channels that were previously processed to determine if the current receiver system 200 is included in any of the targeted talkgroup affiliations. If none of the decoded TG-IDs correlate to the current receiver system 200, the decision block 326 branches to block 328 to determine if additional scan iterations are needed so as to sample all allowable channels within the allocated spectrum assigned for DMO operations. The scan iterations will continue to step through and sample contiguous RB channels until all DMO allocated RF spectrum has been processed and checked for TG-ID vectors that may be affiliated with the receiver's talk group. This process is then repeated cyclically until detection at decision block 326 of a TG-ID vector associated with the receiver system 200 (or until interrupted by a supervisory processor). If a TG-ID vector is detected that is affiliated with the receiver system 200, then decision block 326 branches to WS processing block 340, thereby interrupting the aforementioned continuously looping scan sequences. The scan engine steps through the RF spectrum allocated for DMO operation using the following methodology. If the query executed at block 328 affirms that the previously processed sampled spectrum marks the terminus range of all allocated RF spectrum associated with DMO operation, then decision block 328 branches to block 330 where the scan loop metrics are reset so as to begin a new series of scan iterations starting at the beginning of the allocated RF spectrum assigned to DMO operation. Specifically, at block 330 any scan counters that control the iteration index of the scan routine, as well as initialization of programming sequences necessary for configuring the FGU, BPF BW settings, and gain stage setting are reset to their default operational values.

At block 332, the scan index is incremented by one, which is indicative of updating the current scan control metrics. At block 334, an N value is reset so as to initialize the scan operation to wide band scan mode, where N controls the number of contiguous RB channels to be captured in the sampled RF spectrum. At block 336, the LO is set to the appropriate center frequency such that the targeted RF spectrum is contained within the BW of the IF filter 235 so as to facilitate proper reception of any desired on channel signals as may be present. At block 338, the DSP is reset such that FIR selectivity block 257 is configured for the appropriate FIR selectivity, and other DSP registers are initialized as may be necessary for calculating a new set of received sampled data. After block 338, the method 300 loops back to block 306 for resumption of the scan sequence as described in previous iteration steps (i.e., the method 300 continues to scan until it is interrupted by a supervisory processor or until a decision branch re-directs the method 300).

At block 340, all relevant Walsh sequences appropriate for the receiver system 200 are parallel processed through matched filters to determine if a valid WS index x may have been recovered from any of the signaling received within the RB channels. For the purpose of this disclosure a matched filter is a cross-correlation function matched to a specific Walsh Sequence. As will be evident to those skilled in the art, parallel processing of multiple WS matched filters may significantly increase the power consumption of the receiver system 200; therefore this processing is initiated only after prior detection of an affiliated TG-ID at decision block 326. At block 342, any recovered WS indices are correlated to a known bandwidth and operating center frequency as may be allocated to support DMO operation. Efficient decoding of multiple Walsh Sequences may comprise simultaneous digital signal processing of parallel matched filters providing cross-correlation response(s) for those WS vectors appropriate for the receiver system 200. At block 344, any response(s) from the plurality of matched filters (block 266 of FIG. 2B) would indicate the presence of a valid WS vector, thereby triggering a branch to block 346 wherein the receiver configuration may be adjusted accordingly based on the WS index. For the purposes of this disclosure, a WS index is a unique number assigned to a specific WS vector based on that particular vector's location in a tabularized ordering of all valid Walsh Sequences appropriate for the receiver system 200. If the WS information does not correlate, or if the WS information could not be extracted from the sampled received data, or if the WS information does not match those WS vectors appropriate for the receiver system 200, then the method 300 resumes the previously described scan iterations by branching from block 344 to block 328. However, if a WS vector correlates to the present receiver system 200, then the previously extracted bandwidth and operating center frequency for proper DMO operation are valid and the method 300 branches to block 346.

At block 346, the receiver LO operating frequency and RF/IF BW setting are adjusted as appropriate based on the index derived from the Walsh sequence correlation. At block 348, any time symbols within the protocol are synchronized as may be necessary to correctly receive the incoming device-to-device (D2D) messaging. At block 350, formatting is executed to enable any frame engine within the DSP that is needed to support the operating protocol (e.g., a Physical Up Link Signaling Channel (PUSCH) channel format can be enabled). At block 352, as required, interleaving is enabled to support framing and error correction within the protocol being used (e.g., Physical Control Format Indicator Channel: PCFICH). Finally, at block 354, D2D communication begins by correct processing of the received signal and associated data packets, in accordance with the protocol standards governing the radio network 100.

Figure 4:
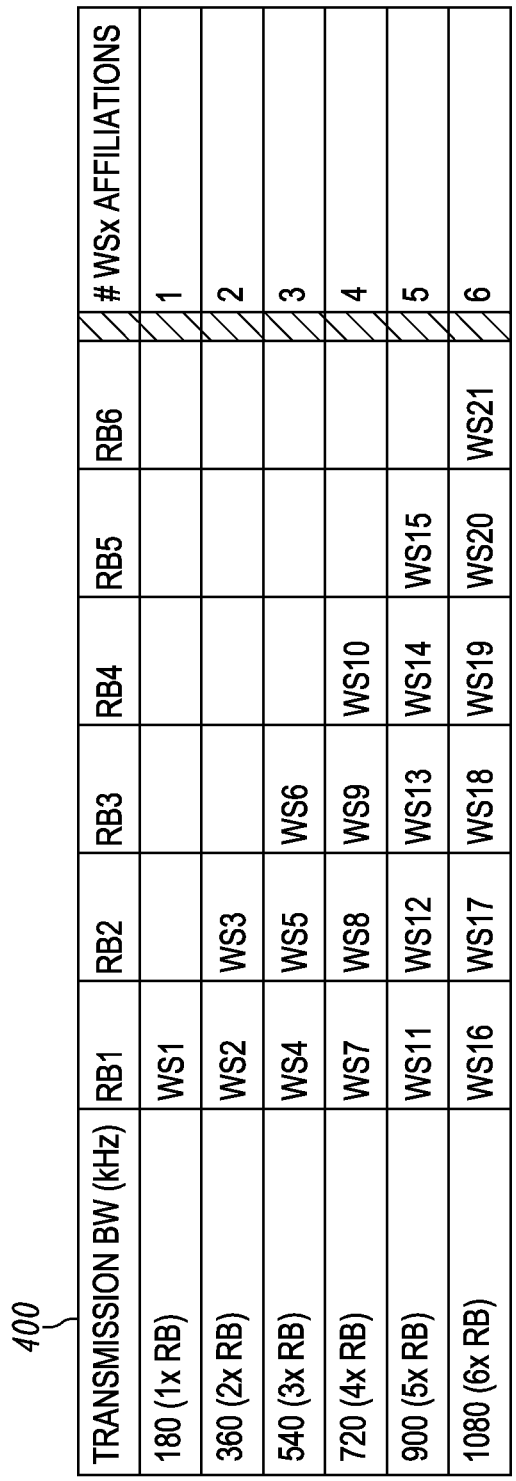
FIG. 4 is a table illustrating a resource block (RB) positioning of Walsh sequences for a given transmission bandwidth, according to some embodiments.

Finally, according to some embodiments a predetermined hang-time can be appended to a termination of reception of the DMO transmission, thus enabling a response transmission having a same timing, bandwidth and center frequency of the DMO transmission FIG. 4 is a table illustrating a resource block (RB) positioning of Walsh sequences for a given transmission bandwidth, according to some embodiments. For the purposes of the illustration shown in FIG. 4, column 400 shows six possible transmission bandwidths, from 180 kHz to 1080 kHz as indicated by the first column labeled "Transmission BW (kHz)". It is assumed that any number of contiguous RB channels, between one and six, can be concatenated to form a contiguous range of spectrum over which the D2D transmission may transpire. Accordingly, each row of FIG. 4 corresponds to a particular RB channel transmission BW. Each column labeled RB1, RB2, RB3, . . . RB6 represents the unique index number assigned a given RB channel based on that RB's general position relative to other RB channels that form a composite transmission channel. Each RB index is associated with a unique Walsh Sequence that is transmitted over that particular RB channel.

The function of the tabularized Walsh Sequences of FIG. 4 and their correlation to a DMO center frequency of operation, and transmission BW, is described as follows. If the subsequent D2D transmission is to occupy only one RB channel, then a unique Walsh Sequence of index 1 (WS1) will be transmitted on that single RB channel. When the receiver system 200 decodes a WS1 value, the receiver system 200 knows that, by definition, WS1 correlates to a DMO transmission BW being a single RB channel and the center frequency of the DMO transmission will be the center frequency of the RB channel from which the WS1 coding was recovered.

Alternatively, if the D2D transmission is to occupy two (2) RB channels, then two unique Walsh Sequences of index 2 & 3 are transmitted (WS2 & WS3) where WS2 is transmitted on a first RB channel and WS3 is transmitted on a second (adjacent) RB Channel. Note that the Walsh Sequence for a single RB channel transmission (WS1) is different from, and orthogonal to, either of the Walsh Sequences used in the transmission associated with two RB channels (WS2, and WS3). The receiver system 200 may receive either of the Walsh Sequences individually or together, and from any of the single RB channel Walsh Sequences the subsequent center frequency and transmission BW of the DMO communication can be extracted. In other words, if the receiver system 200 successfully decodes WS2 from a first RB channel (spectrally lower frequency), it knows a priori that WS2 is always paired with a corresponding WS3, even if the RB channel carrying the WS3 information was not decoded. Therefore, by decoding WS2, the receiver system 200 knows that the DMO transmission BW will be two RB channels wide, and that the center frequency will be at the upper band edge of the first RB channel (that channel having WS2). Alternatively, if the receiver system 200 successfully decodes WS3 from a second RB channel (adjacent to the first RB channel that is spectrally higher in frequency), then the receiver system 200 knows a priori that WS3 is always paired with a corresponding WS2, even if the RB channel carrying the WS2 information was not decoded. Therefore, by decoding WS3, the receiver system 200 knows that the DMO transmission BW will be two RB channels wide, and that the center frequency will be at the lower band edge of the second RB channel (i.e., the channel having WS3). It is also apparent that if both WS2 and WS3 are decoded, the same center frequency and transmission BW are recovered in duplicate.

The preceding RB channel to Walsh sequence associations are, in like manner, duplicated up to the limit case of six (6) contiguously concatenated RB channels, where the indexed Walsh Sequences of WS16, WS17, WS18, WS19, WS20, and WS21 are transmitted for a transmission BW of six concatenated RB channels. Each RB channel contains a unique, and orthogonal, Walsh Sequence that is correlated to its spectral location (e.g., a first RB channel containing WS16 is adjacent to a second RB correlated to WS17, which is adjacent to a third RB correlated to WS18, and so on). Each WS index WS16 through WS21 is unique and orthogonal to all previously delineated WS indices WS1 through WS15. Consequently, it becomes apparent that there are twenty-one (21) Walsh Sequences (WS1 to WS21) that are uniquely affiliated with a particular RB Channel depending on the composite transmission BW and the relative location of the RB channel with respect to other RBs that comprise the transmission bandwidth. By virtue of the Walsh Sequence hierarchy, a proper Walsh Sequence decode for any given single RB channel is indicative of the total D2D transmission bandwidth and frequency position. For example, a proper reception and decode of WS18 indicates to the receiver system 200 that the subsequent DMO transmission will be six (6) RB channel wide, since by definition WS18 is only transmitted in tandem with WS16 through WS21, each sequence being deterministically located in the appropriate RB channel as reflected in FIG. 4. Therefore, by virtue of the WS18 decode, the receiver system 200 knows that the particular channel containing WS18 is the $3^{rd}$ RB channel which is to be used in the concatenated DMO transmission. From this information, the receiver system 200 knows the DMO center frequency will correspond to the upper band edge of the RB channel (labeled RB3 in the first row of FIG. 4) and can also adjust the RF pass band BW to receive a six RB channel wide transmission. Proper reception and decode of any one (1) of the six simultaneously transmitted Walsh Sequences (WS16 through WS21) will allow the receiver to extract both the center frequency and transmission BW for the subsequent DMO transmission. However, proper decode of multiple WS indices within their designated RB channels (e.g., WS16, WS18, WS19 for RB channels 1, 3 and 4) will provide for a more robust system by providing redundancy in communicating the same center frequency and transmission BW information. Accordingly, a numerical rating, or "DMO metrics confidence interval", can be generated that takes into account all recovered WS indices, where agreement between all Walsh Sequences indicating the same DMO metrics is weighted higher than that of a single recovered WS, indicating a multiple RB channel wide DMO transmission. The duration of the WS transmission is determined by the code length needed to achieve orthogonality for a maximum number of Walsh Sequences required (in this example 21), and the amount of coding gain required to meet system metrics as dictated by the particular protocol that is governing the allocated spectrum.

Those having ordinary skill in the art will appreciate that although the use of Walsh sequences are known in the art, the present disclosure describes the application of deterministically affiliating a particular WS index within a family of WS indices to multiple transition metrics. In addition, while the details in this disclosure are limited to six (6) concatenated RB channels as an example, various other error tolerant code sequences also can be used and wider transmission BWs can be accomplished by expanding the relationships outlined in the present disclosure.

Figure 5:
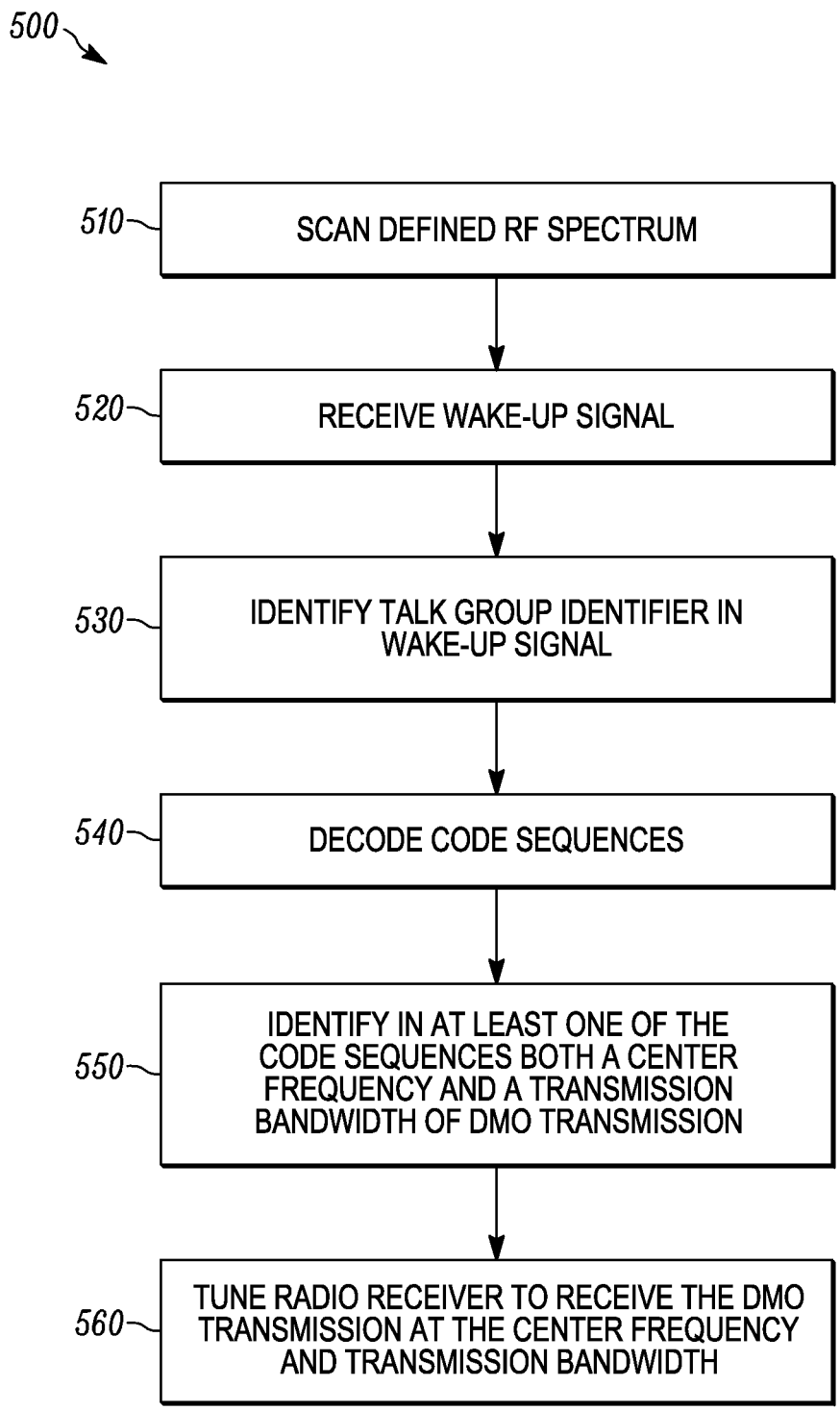
FIG. 5 is a flow diagram illustrating a method for receiving at a radio receiver a DMO transmission to a talkgroup, according to some embodiments.

FIG. 5 is a flow diagram illustrating a method 500 for receiving at a radio receiver a DMO transmission to a talkgroup, according to some embodiments.

At block 510, a defined radio frequency spectrum is scanned by the radio receiver. For example, the receiver system 200 included in one of the subscriber units 110 operating in the radio network 100 scans an LTE RF spectrum of the network 100.

At block 520 a wake-up signal is received at the radio receiver in the defined radio frequency spectrum. For example, as described above regarding block 310 of the method 300, an appropriate number of samples are captured, where the number of samples is commensurate with a duration necessary to satisfy Nyquist criterion for the bandwidth setting. These samples are subsequently processed and a Correlation Word (CW0) may be decoded at block 322 as a wake up signal preamble, which indicates the targeted receiver group that may necessitate activation of additional receiver processing.

At block 530, a talkgroup identifier is identified in the wake-up signal, wherein the talkgroup identifier corresponds to a talkgroup being monitored by the radio receiver. For example, as described above regarding block 326 of the method 300, TG-IDs are checked for multiple RB channels and it is determined that the current receiver system 200 is included in one of the targeted D2D affiliations.

At block 540, in response to identifying the talkgroup identifier, code sequences received at the radio receiver and associated with the talkgroup identifier are decoded. As will be understood by those having ordinary skill in the art, in various embodiments the code sequences may or may not be included in the wake-up signal. For example, as described above regarding block 340 of the method 300, a series of Walsh Sequences are parallel processed to determine an index x for each of the recovered RB channels. This action is initiated in the event that an affiliated TG-ID matches the TG-ID at decision block 326 of the current receiver system 200.

At block 550, from at least one of the code sequences both a center frequency and a transmission bandwidth of the DMO transmission is identified. For example, as described above regarding block 344 of the method 300, it is determined that at least one of the Walsh sequence indices previously derived are appropriate for the present receiver system 200. Further, identifying in at least one of the code sequences both a center frequency and a transmission bandwidth of the DMO transmission can comprise correlating the code sequence index in a deterministic fashion as described in FIG. 4, where the index value is correlated to at least one of: a) the center operating frequency of the DMO transmission; and b) an occupied bandwidth of the DMO transmission.

At block 560, the radio receiver is adjusted to receive the DMO transmission at the center frequency and transmission bandwidth previously determined at step 550. For example, as described above regarding block 354 of the method 300, D2D communication begins by correct processing of the received signal and associated data packets, in accordance with the protocol standards governing the radio network 100.

In summary, advantages of the present disclosure include enabling adaptive scanning of the entirety of a spectrum such as the LTE spectrum using groups of contiguous resource blocks to simultaneously detect targeted DMO signaling and spectrum availability. The present disclosure thus enables combining elements of narrow band LMR direct mode wireless communication into a variable bandwidth, agile spectrum D2D system that is scalable to signaling such as LTE PUSCH signaling.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a . . . ", "has a . . . ", "includes a . . . ", "contains a . . . " does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for receiving at a radio receiver a direct mode operation (DMO) transmission to a talkgroup, the method comprising:
    scanning at the radio receiver a defined radio frequency spectrum;
    receiving at the radio receiver in the defined radio frequency spectrum a wake-up signal;
    identifying a talkgroup identifier in the wake-up signal, wherein the talkgroup identifier corresponds to a talkgroup being monitored by the radio receiver;
    in response to identifying the talkgroup identifier, decoding code sequences received at the radio receiver and associated with the talkgroup identifier;
    identifying in at least one of the code sequences both a center frequency and a transmission bandwidth of the DMO transmission;
    tuning the radio receiver to receive the DMO transmission at the center frequency and transmission bandwidth; and
    wherein the code sequences are Walsh code sequences and wherein decoding the code sequences comprises digital signal parallel processing of matched filters for Walsh sequence cross-correlation.

2. The method of claim 1, wherein identifying in at least one of the code sequences both a center frequency and a transmission bandwidth of the DMO transmission comprises looking up an index of a code sequence in a predefined table, where the index lists at least one of: a) an amount of frequency between the center frequency of the DMO transmission and a current center frequency of the radio receiver; b) whether the amount of frequency should be added or subtracted to the current center frequency; and c) an occupied bandwidth of the DMO transmission.

3. The method of claim 1, wherein the defined radio frequency spectrum is defined by a plurality of contiguous resource blocks, and wherein the code sequences each correspond to a single resource block.

4. The method of claim 1, wherein a predetermined hang-time is appended to a termination of reception of the DMO transmission, thus enabling a response transmission having a same timing, bandwidth and center frequency of the DMO transmission.

5. The method of claim 1, wherein the DMO transmission comprises a data packet of a Long-Term Evolution (LTE) Physical Up-link signaling channel (PUSCH).

6. The method of claim 1, wherein the code sequences are included in the wake-up signal.

7. A method for transmitting from a radio transmitter a direct mode operation (DMO) transmission to a talkgroup, the method comprising:
    determining a required bandwidth for the DMO transmission in a defined radio frequency spectrum;
    identifying a range of contiguous resource blocks that are available for use in the defined radio frequency spectrum;
    transmitting a wake-up signal, wherein the wake-up signal comprises a talkgroup identifier;
    transmitting code sequences associated with the talkgroup identifier that identify both a center frequency and a transmission bandwidth corresponding to the range of contiguous resource blocks that are available for use in the defined radio frequency spectrum; and transmitting the DMO transmission at the center frequency and transmission bandwidth.

8. The method of claim 7, wherein the DMO transmission comprises a data packet of a Long-Term Evolution (LTE) Physical Up-link signaling channel (PUSCH).

9. The method of claim 7, wherein the code sequences are Walsh code sequences.

10. A radio receiver for receiving a direct mode operation (DMO) transmission to a talkgroup, the radio receiver comprising:
a receiver system including a protocol specific device to device (D2D) control system, wherein the receiver system and D2D control system are configured to:
scan at the receiver system a defined radio frequency spectrum;
receive at the receiver system in the defined radio frequency spectrum a wake-up signal;
identify a talkgroup identifier in the wake-up signal, wherein the talkgroup identifier corresponds to a talkgroup being monitored by the receiver system;
in response to identifying the talkgroup identifier, decode code sequences received at the receiver system and associated with the talkgroup identifier;
identify in at least one of the code sequences both a center frequency and a transmission bandwidth of the DMO transmission;
tune the receiver system to receive the DMO transmission at the center frequency and transmission bandwidth; and
wherein the code sequences are Walsh code sequences and wherein decoding the code sequences comprises digital signal parallel processing of matched filters for Walsh sequence cross-correlation.

11. The radio receiver of claim 10, wherein identifying in at least one of the code sequences both a center frequency and a transmission bandwidth of the DMO transmission comprises looking up an index of a code sequence in a predefined table, where the index lists at least one of: a) an amount of frequency between the center frequency of the DMO transmission and a current center frequency of the radio receiver; b) whether the amount of frequency should be added or subtracted to the current center frequency; and c) an occupied bandwidth of the DMO transmission.

12. The radio receiver of claim 10, wherein the defined radio frequency spectrum is defined by a plurality of contiguous resource blocks, and wherein the code sequences each correspond to a single resource block.

13. The radio receiver of claim 10, wherein a predetermined hang-time is appended to a termination of reception of the DMO transmission, thus enabling a response transmission having a same timing, bandwidth and center frequency of the DMO transmission.

14. The radio receiver of claim 10, wherein the DMO transmission comprises a data packet of a Long-Term Evolution (LTE) Physical Up-link signaling channel (PUSCH).

15. The radio receiver of claim 10, wherein the code sequences are included in the wake-up signal.

16. A radio transmitter for transmitting a direct mode operation (DMO) transmission to a talkgroup, the radio transmitter comprising:
a transmitter system including a protocol specific device to device (D2D) control system, wherein the transmitter system and D2D control system are configured to:
determine a required bandwidth for the DMO transmission in a defined radio frequency spectrum;
identify a range of contiguous resource blocks that are available for use in the defined radio frequency spectrum;
transmit a wake-up signal, wherein the wake-up signal comprises a talkgroup identifier;
transmit code sequences associated with the talkgroup identifier that identify both a center frequency and a transmission bandwidth corresponding to the range of contiguous resource blocks that are available for use in the defined radio frequency spectrum; and
transmit the DMO transmission at the center frequency and transmission bandwidth.

\* \* \* \* \*